United States Patent
De Cooper Jones

[11] Patent Number: 5,492,719
[45] Date of Patent: Feb. 20, 1996

[54] POLYMER MATRIX COMPOSITE STRUCTURES

[76] Inventor: Mark De Cooper Jones, 87 Enfield Road, Hunt End, Redditch, Worcestershire B97 5NE, England

[21] Appl. No.: 286,629

[22] Filed: Aug. 5, 1994

[51] Int. Cl.⁶ .................................................. B05D 5/12
[52] U.S. Cl. ..................... 427/123; 427/124; 427/290; 427/401; 427/404; 427/407.1; 427/407.3; 427/443.1; 428/902
[58] Field of Search .................. 427/121, 123, 427/124 VD, 443.1, 407.3, 404, 407.1, 401, 290; 428/902

[56] References Cited

U.S. PATENT DOCUMENTS 4,522,889  6/1985  Ebneth et al. ..................... 428/614

FOREIGN PATENT DOCUMENTS

| | | | |
|---|---|---|---|
| 0206721 | 12/1986 | European Pat. Off. | ........ C03C 25/04 |
| 046399 | 1/1992 | European Pat. Off. | .......... B29D 9/00 |
| 731812 | 6/1955 | United Kingdom . | |

OTHER PUBLICATIONS

Patent abstracts of Japan, vol. 9, No. 211, C–300, Abstract of JP–A–60–77151 (Asahi Glass k–k) May 1, 1985.
Patent abstracts of Japan, vol. 10, No. 303, C–378, abstract of JP–A–61–117136 (Asahi Glass k–k) Jun. 4, 1986.

Primary Examiner—James J. Bell
Attorney, Agent, or Firm—Oldham & Oldham Co.

[57] ABSTRACT

A polymer matrix composite structure for electrical purposes is produced by taking a fibre reinforcement substrate (1) to produce a pre-form (4) of a desired shape and configuration, metallising the pre-form to provide an electrically conductive coating for EMC capability, and impregnating the metallised pre-form with resin.

10 Claims, 1 Drawing Sheet

POLYMER MATRIX COMPOSITE STRUCTURES

BACKGROUND OF THE INVENTION

This invention relates to improvements in polymer matrix composite structures of the kind including metallised fibres in a polymer material for electrical purposes.

It is known to produce polymer matrix composite structures of the kind set forth by incorporation of metal fibres, application of electrically conductive coatings to fibres, or incorporation of electrically conductive fillers. In the case of the fibre type knitted or woven into fabrics, such fabrics, in turn, are shaped to the required pre-form configuration.

Wet surface metallisation of the polymer matrix composite structures reduces the properties and stability of the polymer component. Metallised fabrics for EMC suffer from poor pre-form capability and poor performance for EMC due to conductivity attrition during the formation of the pre-form.

It is known, for example from GB-A-2 118 477, to use an injection moulding technique for moulding an insulating liner onto a metal spool.

We are also aware of EP-A-0 074 263 which discloses the use of woven fabric reinforced laminates comprising filaments of electrically conductive material, suitably metal, metal coated fibre glass, Kevlar (Registered Trade Mark), or carbon.

According to our invention a polymer matrix composite structure of the kind set forth is produced by taking a fibre reinforcement substrate, pre-forming the substrate to produce a pro-form of a desired shape and configuration, metallising the pre-form to provide an electrically conductive coating for EMC capability, and impregnating the metallised pre-form with resin.

The metallised fibres may comprise fibres of glass, or carbon.

We therefore provide a polymer matrix composite structure of high mechanical performance since the advantageous bulk properties and dimensional tolerances of conventional composites are retained, accompanied by higher stability of metallisation since the coating is protected from the environment. We are also able to achieve high shape complexity at low capital cost with the capability to include thermal control measures in the material structure.

By the use of this process we are able to produce complex polymer matrix composite structures having high mechanical and electro-magnetic compatability (EMC) and a selective thermal management capability.

The substrate may comprise a reinforcement material in a woven, knitted or continuous fibre form which maybe cut and then pre-shaped to the desired shape and configuration of the pre-form.

Knitted substrates are preferred, as this maximises conductivity in the surface, by minimising the non-conductive paths formed by any fibres overlapping in the plane of the fabric, such as in plain woven fabrics, due to shadowing from the metallisation source. With woven fabrics, low profile satin weave fabrics reduce this effect. With unwoven unidirectional fabrics the substrate shows significant directionality, due to the metallisation following the fabric direction. This can be beneficial in providing high electrical conduction in certain directions in the multi-layer laminate produced by combining multiple orientated fabric layers in the material. This is of less relevance if wet metallisation techniques are employed, but still significant. However the three dimensional electrically conductive network produced specifically by metallising the knitted fabric structure by penetrating magnetron sputtering (PVD coating), has shown electrical resistivities $10^1$ to $10^6$ less than equivalent coatings on woven structures, i.e., $~10^{-2}$ ohms/square (surface resistivity). The coating in this case was NI-Cr (0.1–0.3 µm)/Cu(1–3 µm)/Au(~0.1 µm), and was as thin as feasible to achieve useful conductivity, in order to achieve minimum weight increase and coating process time. However increases in the electrical conductivity through the use of thicker PVD coatings and different coating metals can be conveniently achieved. Alternatively conductivity can be increased by subsequent overcoating by metal spraying or wet metallisation techniques, e.g. electroless plating. However metal spraying is line of sight, which adversely limits the preform geometry which can be satisfactorily coated. It also yields thick, heavy deposits. Wet coating introduces problems with controlling penetration of the coating into the fabric substrate, but produces uniform coating coverage, largely independent of substrate geometry.

Metallisation of the pre-form may be achieved by using a Physical Vapour Deposition (PVD) method, or wet metallisation techniques.

After metallisation, the pre-form is net shape to be moulded into component form, preferably using the Resin Transfer Moulding (RTM) technique. In such a construction the mould resin infiltrates the pre-form with the benefit of encapsulation of the metallisation, preventing deterioration of the metallisation by outside elements.

This has the advantage of producing little or no attrition of the conductive network produced in metallisation. Thus the maximum conductivity, and hence EMI attenuation can be achieved, and retained throughout component life. Unlike with woven fabrics with metallisation included, the action of the RTM impregnating resin cannot separate the disrupt the conductive paths formed by the touching of coated fibres.

BRIEF DESCRIPTION OF THE DRAWINGS

Some embodiments of our invention are illustrated in the accompanying drawings in which.

DETAILED DESCRIPTION OF THE INVENTION

Figure 1:
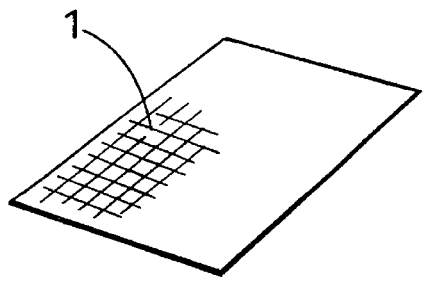
FIG. 1 is a perspective view of a woven fabric.

FIG. 1 of the drawing illustrates fibres, for example of glass, or carbon, woven to form a sheet 1. The sheet is then cut to the developed form of a desired pre-form as shown in FIG. 2 of the drawings.

Figure 3:
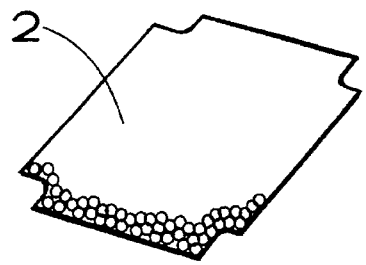
FIG. 3 illustrates a developed pre-form similar to FIG. 2 but which is knitted to the desired shape.
Figure 2:
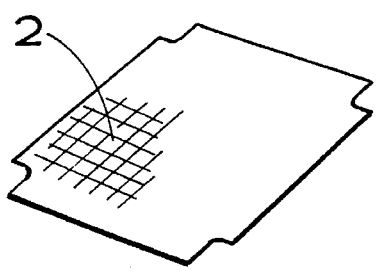
FIG. 2 shows the fabric in a developed form suitable to form a pre-form.

Alternatively, as shown in FIG. 3, the developed pre-form 2, illustrated in FIG. 2, can be produced in a single knitting operation.

The fibres forming the developed pre-forms of FIGS. 2 or 3 comprise thermo-formable synthetic resins acting as binders to achieve shape retention in the shaped pre-form.

Figure 4:
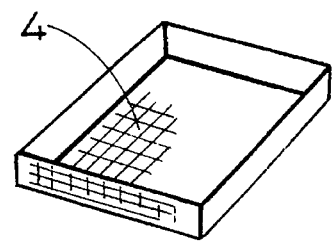
FIG. 4 shows the developed pre-forms of FIGS. 2 and 3 deformed to form the pre-form.

The developed pre-forms can be pressed when hot to a suitable net shape, for example as shown in FIG. 4 in the configuration of a rectangular box 4. After hot pressing the shape is allowed to cool to fix the configuration of the pre-form.

In a modification the knitted developed pre-form of FIG. 3 can be placed in a tool and stitched to the necessary shape, for example to the shape of a box having the configuration illustrated in FIG. 4 of the accompanying drawings.

After formation of the pre-form illustrated in FIG. 4 metal inserts, for fastening mechanisms, or for heat sinking, can be introduced into the structure.

Figure 5:
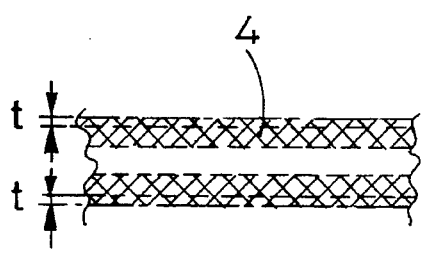
FIG. 5 is a section through the material of the pre-form following metallisation.

The pre-form of FIG. 4 is then metallised, suitably by the use of a metal sputtering Physical Vapour Deposition (PVD) method. This can produce non-line of sight coating and the ability to electrically bias the pre-form to control coating response. The metallisation produces high conducting surfaces on the outside of the pre-form but also penetrates the "open" surface of the pre-form to produce a graduated depth coating, as illustrated in FIG. 5 of the drawings, in which the penetration of metal is indicated by "t". If necessary a number of pre-forms can be "staged" to produce a multi-conducting layer assembly.

Figure 6:
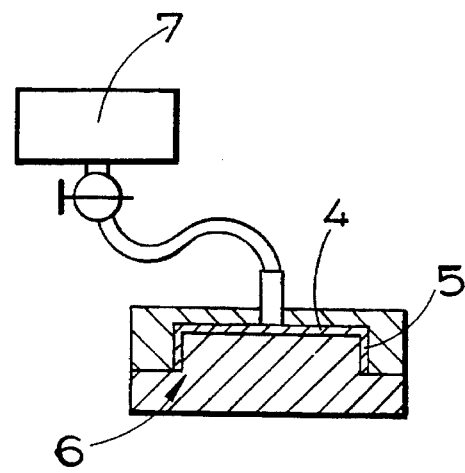
FIG. 6 is a section through a mould showing the injection of resin into a cavity containing the pre-form.

Finally the metallised pre-form 4 is placed in the cavity 5 of a two-part resin injection (moulding) apparatus 6 illustrated in FIG. 6 of the drawings. Synthetic resin is injected into the cavity from an injector 7 in order to impregnate the metallised pre-form with a synthetic resin to form a composite material.

The presence of sub-surface metallisation ensures that upon resin impregnation during the step illustrated in FIG. 6 of the drawings the Electro Magnetic Interference (EMI) attenuation layers will not be exposed to degeneration by the environment and will be insensitive to de-lamination damage from abuse.

Similar but less convenient metallisation (i.e. not a one-shot process and limited coating depth control), can also be achieved by wet electroless plating, for example nickel plating of the fibre pre-form assembly.

The RTM moulded metallised pre-form part produced by the method described above has high mechanical performance, and high EMC performance, retained with time. The RTM process can produce highly complex parts at low capital and tool costs. Provision of grounding of the metallisation along component edges is straightforward to achieve. For example tooling can be designed so that the pre-forms have an unimpregnated zone at the component edge which can subsequently interface with an EMC gasket, or can allow flow soldering of an electrical contact shim. This ensures high levels of EMT capability.

I claim:

1. A method of producing a polymer matrix composite structure of the kind including metallised fibres in a polymer material for electrical purposes, characterised in that the method comprises the steps of:

a) firstly taking a fibre reinforcement substrate (1);

b) secondly, pre-forming the substrate (1) to produce a pre-form (4) of a desired shape and configuration;

c) thirdly, metallising the pre-form (4) to produce an electrically conductive coating for EMC capability; and d) fourthly, impregnating the metallised pre-form (4) with resin.

2. A method according to claim 1, including the step of adapting the substrate (1) into a developed pre-form (2) before forming the substrate into the pre-form (4).

3. A method according to claim 2, in which the substrate (1) comprises a woven sheet, and a cutting step is utilised to adapt the sheet to the developed pre-form (2).

4. A method according to claim 2, in which the substrate in the configuration of the developed pre-form (2) is formed by knitting operation.

5. A method according to claim 2, wherein the fibres forming the developed preform comprise thermoformable synthetic resins, and including the step of pressing the developed preform (2) into a suitable shape when hot.

6. A method according to claim 2 comprising stitching the developed pre-form (2) into a suitable shape.

7. A method according to claim 1, including the step of introducing metal inserts into the structure between steps a) and b) for control of local thermal conductivity.

8. A method according to claim 1, including using a metal sputtering Physical Vapour Deposition (PVD) method for carrying out step c).

9. A method according to claim 1, including using wet electroless plating for carrying out step b).

10. A method according to claim 1, in which step c) is carried out by the use of a Resin Transfer Moulding (RTM) technique.

* * * * *